Figure 2A:
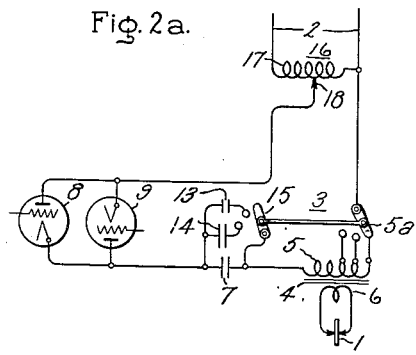

Sept. 16, 1941.    L. G. LEVOY, JR    2,256,209
ELECTRIC TRANSLATING CIRCUIT
Filed Aug. 17, 1939    4 Sheets-Sheet 1
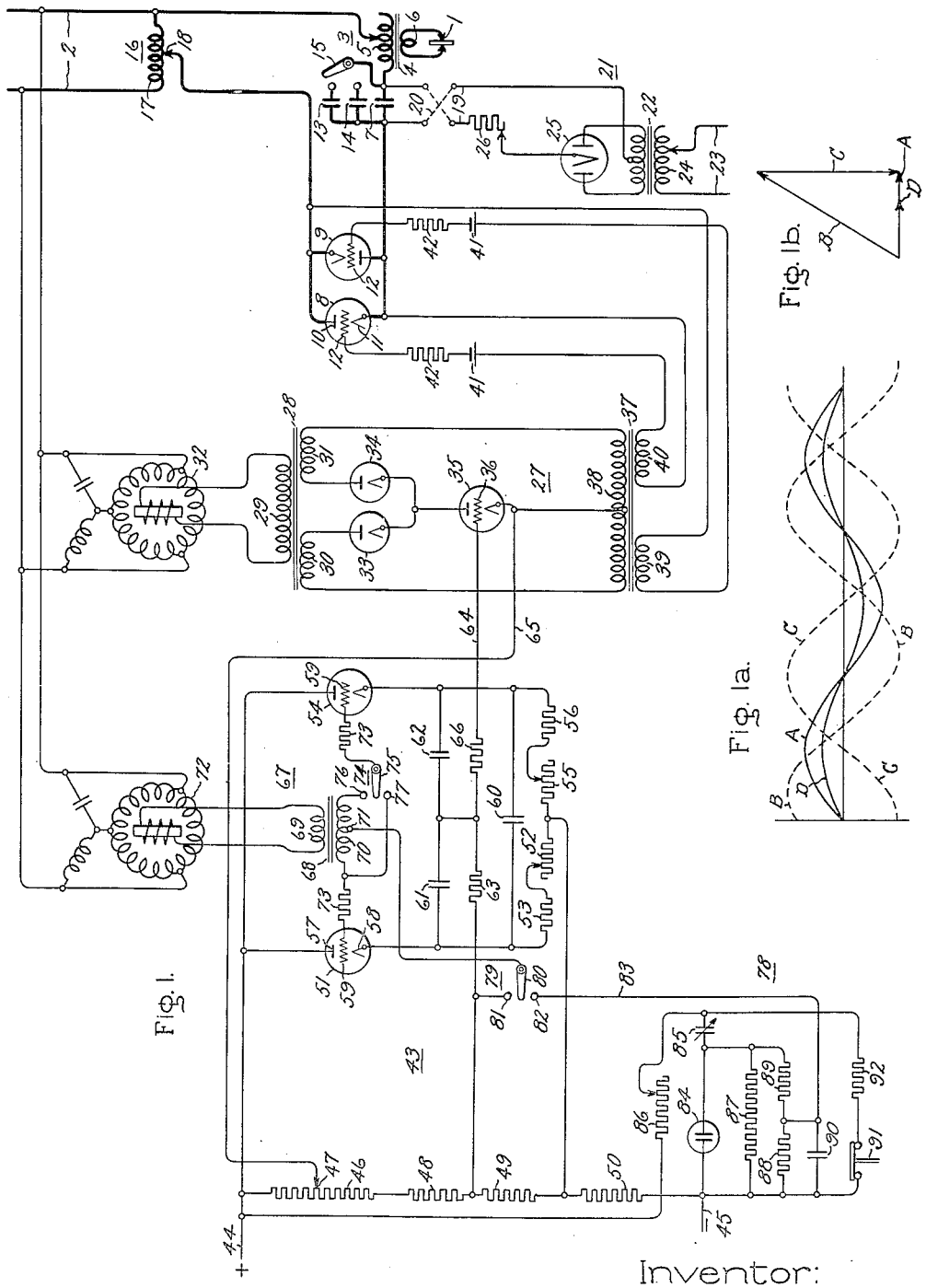
Inventor:
Louis G. Levoy, Jr.,
by Harry E. Dunham
His Attorney.

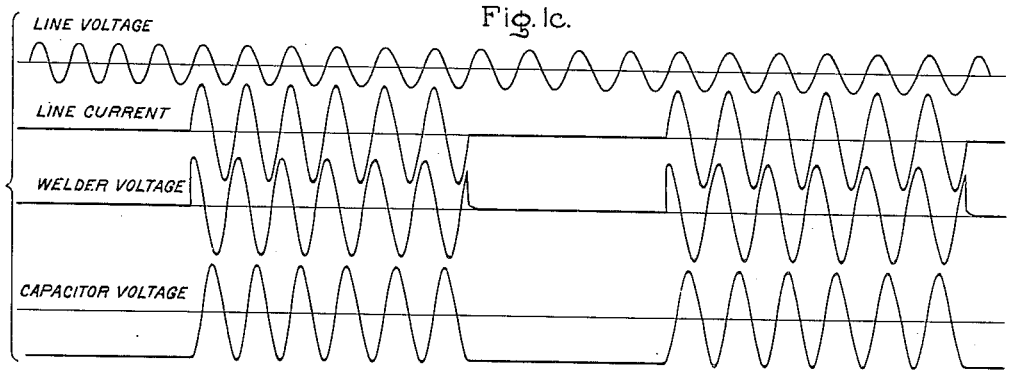
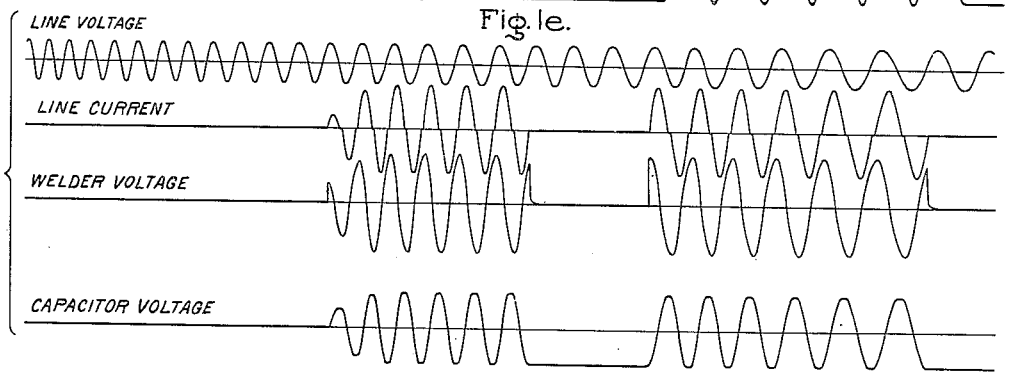
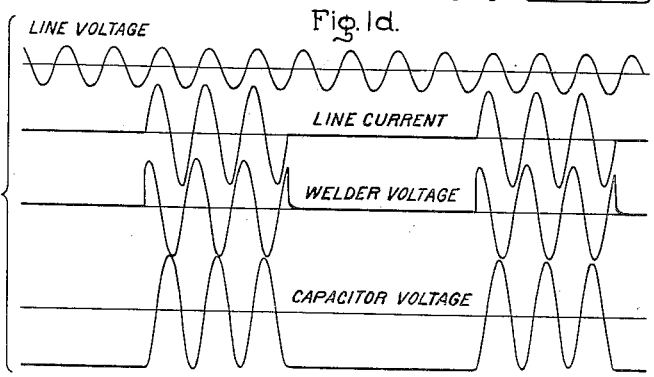
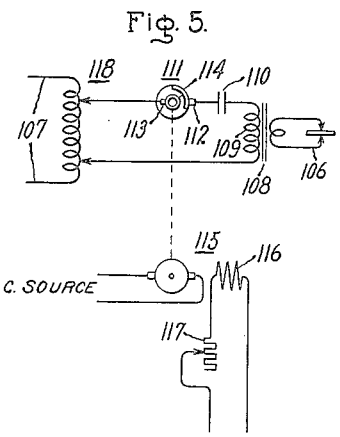
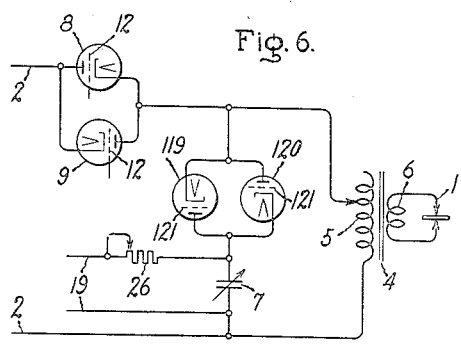

Inventor:
Louis G. Levoy, Jr,
by Harry E. Dunham
His Attorney.

Sept. 16, 1941.　　　L. G. LEVOY, JR　　　2,256,209
ELECTRIC TRANSLATING CIRCUIT
Filed Aug. 17, 1939　　　4 Sheets-Sheet 4

Inventor:
Louis G. Levoy, Jr.,
by Harry E. Dunham
His Attorney.

Patented Sept. 16, 1941

2,256,209

UNITED STATES PATENT OFFICE 2,256,209

ELECTRIC TRANSLATING CIRCUIT

Louis G. Levoy, Jr., Ballston Lake, N. Y., assignor to General Electric Company, a corporation of New York Application August 17, 1939, Serial No. 290,602

51 Claims. (Cl. 171—119)

My invention relates to electric translating circuits and more particularly to electric valve circuits for effecting energization of a load circuit from an alternating current circuit.

This application is a continuation-in-part of my copending patent application Serial No. 231,087, filed September 21, 1938, entitled "Electric valve circuit" and which is assigned to the assignee of the present application.

Where an intermittent or pulsating load is imposed on an alternating current circuit and where the load circuit or the incident translating apparatus includes inductive devices, the starting operations and the intermittent pulsations impose low power factor conditions on the supply circuit. For example, electric resistance welders, electric furnaces, and the like which are energized from alternating current circuits, impose on these circuits both transient and steady state conditions which involve an objectionable reduction in the power factor of the current consumed from the circuits. Various arrangements have been devised heretofore for correcting these objectionable starting transients and lower power factor operating conditions. The prior art arrangements have entailed the use of an inordinate amount of auxiliary equipment to obviate these conditions. In accordance with the teachings of my invention described hereinafter, I provide a new and improved electric translating system whereby an intermittent or pulsating load energized from an associated alternating current supply circuit is controlled so that the large current starting transients are substantially eliminated and the power factor of the system is substantially improved.

In electric valve circuits employed for effecting energization of a load circuit periodically from an alternating current supply circuit, there have been imposed on the supply circuit low power factor conditions due to the reactance of the associated equipment. For example, in electric welding circuits using electric valves, the need for power factor correction has become great since the associated transforming devices and the electric valves act to connect periodically low impedance inductive devices across the supply circuit. Because the load is generally discontinuous, it is usually not satisfactory to correct the power factor by the use of a shunt capacitance bank connected permanently to the supply circuit. In accordance with the teachings of my invention described hereinafter, I provide a new and improved electric valve translating circuit in which the low power factor condition is corrected without involving the disadvantages of the prior art arrangements.

It is an object of my invention to provide a new and improved electric translating circuit.

It is another object of my invention to provide a new and improved electric translating circuit for improving the power factor imposed on an alternating current supply circuit where the load is of an intermittent or pulsating nature.

It is another object of my invention to provide a new and improved method of effecting energization of a load circuit from an alternating current circuit.

It is a further object of my invention to provide a new and improved electric valve translating circuit for effecting energization of a load circuit from an alternating current supply circuit.

It is a still further object of my invention to provide an electric circuit wherein a low power factor device may be supplied intermittently or continuously from an alternating current circuit in such a manner that the alternating current circuit furnishes substantially only energy or in-phase current although the load circuit may be operating at a low power factor. This power factor correction may be accomplished coincidentally with a substantial elimination of the transient starting current.

Briefly described, I provide, in accordance with the illustrated embodiments of my invention, new and improved electric translating circuits for energizing intermittent or pulsating loads from alternating current supply circuits and which substantially eliminate or materially reduce the starting transients and which improve the power factor of the loads imposed on the alternating current circuits. Apparatus built in accordance with my invention effects the improvement of the power factor of the load imposed on the alternating current circuit whether the load circuit is energized synchronously with respect to the voltage of the alternating current circuit, or energized asynchronously with respect to the voltage of that circuit. Furthermore, apparatus built in accordance with my invention permits improvement of the starting conditions and the operating conditions of such systems, whether the load circuit is energized intermittently or whether the load is of a pulsating nature subjected to transient overload conditions.

In accordance with the illustrated embodiment of my invention, I provide a new and improved electric circuit for effecting energization of a load circuit, such as a welding circuit, from an alternating current supply circuit. The translating apparatus comprises a substantially resonant circuit, which may be of the series type or of the parallel type, tuned exactly or approximately to the frequency of the supply circuit, and comprises a capacitance and an inductance which are arranged to be connected to the alternating current supply circuit through a suitable means such as electric valve apparatus. In order to eliminate substantially or entirely the transient current conditions which would be present if the electric valve means were rendered conductive at random during the alternating current cycle, I provide a method of and arrangement for establishing on the capacitance an initial charge. This initial charge may be established by means of a suitable direct current circuit.

In accordance with another feature of the illustrated embodiment of my invention, I provide a new and improved electric valve translating circuit of the above described type in which the substantially resonant circuit, which may be tuned to the frequency of the alternating current supply circuit, is controlled by tuning the resonant circuit to vary the amount of energy transmitted to the load circuit. The apparatus used to tune the resonant circuit may be means for varying the inductance or means for varying the effective capacitance of the resonant circuit.

In accordance with another feature of the illustrated embodiment of my invention, I provide a still further arrangement for controlling the amount of energy transmitted to the load circuit. A variable voltage transforming means may be interposed between the alternating current supply circuit and the electric valve means and the resonant circuit. This means may comprise an autotransformer or other suitable variable voltage transforming device.

Figure 2B:
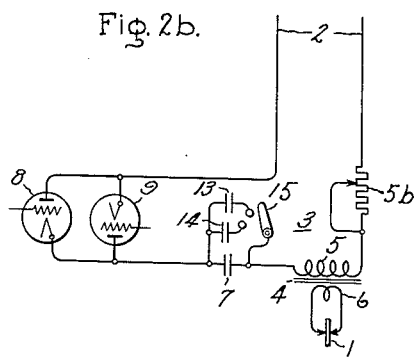
Figure 7:
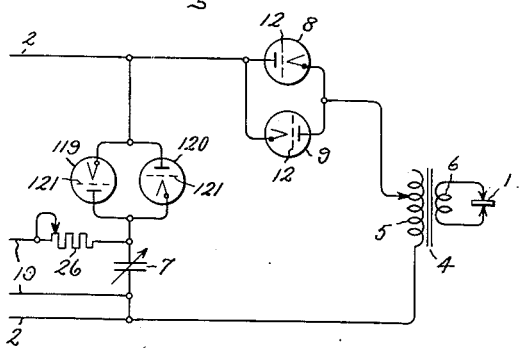
Figure 3:
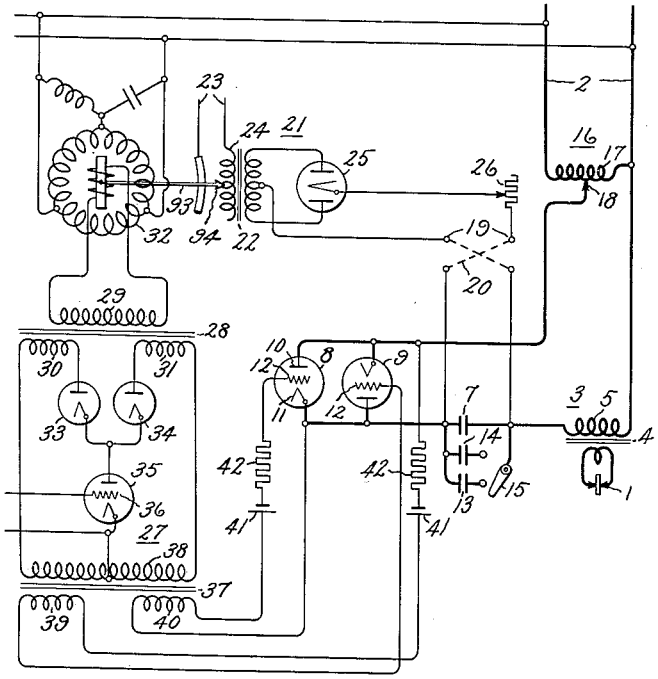
Figure 4:
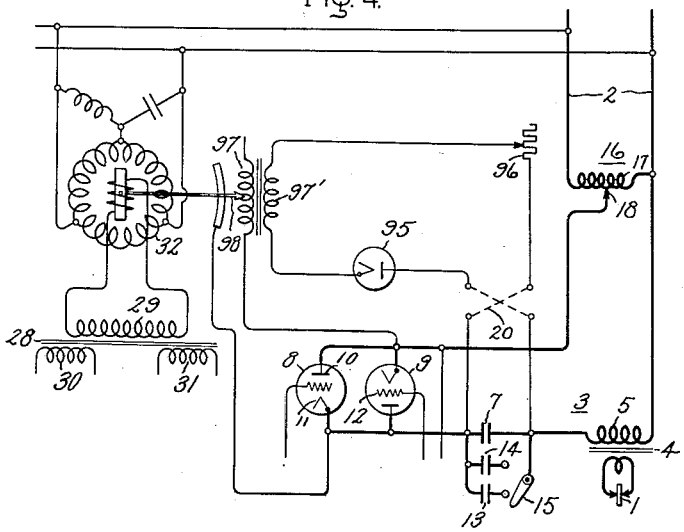

For a better understanding of my invention, reference may be had to the following description taken in connection with the accompanying drawings, and its scope will be pointed out in the appended claims. Fig. 1 of the accompanying drawings diagrammatically illustrates an embodiment of my invention as applied to an electric valve welding circuit, and Figs. 1a and 1b represent certain operating characteristics thereof. Figs. 1c, 1d and 1e represent certain operating characteristics of the arrangement shown in Fig. 1. Figs. 2a and 2b diagrammatically illustrate modifications of the embodiment of my invention shown in Fig. 1 including means for varying the power transmitted to the load circuit. Figs. 3 and 4 diagrammatically illustrate modifications of the arrangement shown in Fig. 1. Fig. 5 illustrates a still further embodiment of my invention as applied to a system in which the load circuit is energized asynchronously with respect to the voltage of the alternating current supply circuit. Figs. 6 and 7 diagrammatically illustrate an embodiment of my invention in which a resonant circuit of the parallel type is employed.

The various embodiments of my invention described hereinafter relate to systems for effecting energization of load circuits from alternating current supply circuits, and where the loads imposed on the alternating current circuits are of an intermittent or pulsating nature. Due to the fact that in practically all translating systems the apparatus involves the use of inductive devices, such intermittent or pulsating loads necessarily entail, in the absence of auxiliary control apparatus, the imposition of transient starting phenomena and low power factor conditions. It is the purpose of the apparatus described hereinafter to correct or substantially eliminate the starting and transient conditions and to improve the power factor of the load imposed on the supply circuits.

Referring now to Fig. 1 of the accompanying drawings, my invention is diagrammatically illustrated as applied to an electric valve translating apparatus for effecting energization of a load circuit, such as a welding circuit 1, from an associated alternating current supply circuit 2. I provide a substantially resonant circuit 3 which may be of the series type, the parallel type, or of the series-parallel type. For the purpose of illustration, I have chosen to represent the resonant circuit 3 as being of the series type. A transformer 4 may be employed to effect energization of the welding circuit 1, and the primary winding 5 thereof may be employed as the inductance of the resonant circuit 3, the secondary winding 6 of the transformer being connected to the welding circuit 1. A capacitance 7 may be connected in series relation with the primary winding 5 of transformer 4 and in the arrangement shown, with the primary winding 5, constitutes a series resonant circuit tuned exactly or approximately to the frequency of the alternating current supply circuit 2.

It is to be understood that the resonant circuit 3 may be tuned to be in exact or approximate resonance with respect to the frequency of the alternating current circuit 2. That is, the term "resonant" is intended to include a circuit of the resonant type where the circuit is exactly tuned or where the circuit is only approximately tuned.

To control the energization of the welding circuit 1 and to connect the resonant circuit 3 in current transmitting relationship with the alternating current supply circuit 2, I provide a suitable circuit controlling means, such as a pair of reversely connected electric valves 8 and 9. The electric valves 8 and 9 are preferably of the type employing an ionizable medium, such as a gas or a vapor, and each comprises an anode 10, a cathode 11 and a control member 12.

To control the resonant circuit 3 to control the amount of energy transmitted to the welding circuit 1, I provide means associated with one or more of the reactive elements of the resonant circuit 3 to control the effective impedance thereof. For example, I may employ a bank of capacitances 13 and 14 and a circuit controlling means, such as a switch 15, which are associated with the capacitance 7 to control the net or effective capacitive reactance of the resonant circuit. The switch 15 is arranged to connect selectively capacitance 13 or capacitance 14 in the resonant circuit. Of course, it is to be understood that I may employ a suitable means associated with the primary winding 5 to control the effective inductive reactance of the resonant circuit to obtain control of the energy transmitted to the welding circuit 1.

As a means for controlling the voltage impressed on the resonant circuit 3 to control the amount of energy transmitted to the welding circuit 1, I provide a suitable voltage transforming means, such as an autotransformer 16 having a winding 17 and an adjustable contact 18. By positioning the adjustable contact 18 along the winding 17, I provide a highly satisfactory arrangement for controlling the amount of energy transmitted to the welding circuit 1. The adjustment of the contact 18 also control the net reflected impedance as of the circuit including the resonant circuit 3 and the valves 8 and 9, viewed from circuit 2, and thereby controls the amount of energy transmitted to the welding circuit 1.

To establish an initial charge on the capacitance 7, or on the capacitances 13 and 14 prior to the time at which the electric valves 8 and 9 are rendered conductive, and to prevent thereby the establishment of a transient current in the circuit, I employ a direct current circuit 19 which may be connected to the capacitances 7, 13 and 14 through a suitable polarity reversing means such as a reversing switch 20. The source of direct current 19 may be provided with any suitable arrangement, such as a rectifier 21 comprising a transformer 22 which may be energized from any suitable source of alternating current 23. The transformer 22 may be provided with an adjustable primary winding 24 so that the magnitude of the output voltage is adjustable. The rectifier 21 may be of the full wave type and may include an electric valve 25 which is connected to the direct current circuit 19 through a relatively high impedance, such as a resistance 26 of relatively large value.

To control the conductivities of the electric valves 8 and 9, I may employ a circuit 27 which produces a predetermined number of impulses of voltage of peaked wave form to render the electric valves 8 and 9 conductive for a corresponding number of half cycles of voltage of the alternating current circuit 2, and hence effects energization of the welding circuit 1 for a corresponding number of half cycles. The circuit 27 is of the type disclosed and broadly claimed in a copending patent application of Harold W. Lord, Serial No. 138,809, filed April 24, 1937, and assigned to the assignee of the present application. The circuit 27, which may be termed a heat control circuit, comprises a transformer 28 designed to provide an alternating voltage of peaked wave form and comprises a primary winding 29 and secondary windings 30 and 31. A suitable phase shifting arrangement, such as a rotary phase shifter 32, may be employed to control the phase of the alternating voltage impressed on primary winding 29 and hence to control the phase of the alternating voltages impressed on control members 12 relative to the voltages impressed on the respective anodes of electric valves 8 and 9, providing thereby an expedient arrangement for controlling the amount of energy transmitted to the welding circuit 1 during each half cycle of voltage of the alternating current circuit 2 during predetermined intervals of conduction. Suitable unidirectional conducting devices, such as electronic discharge devices 33 and 34, are connected in series relation with secondary windings 30 and 31 to impress on serially connected electric valve 35 rectified impulses of alternating voltage which are of peaked wave form. The electric valve 35 is preferably of the type employing an ionizable medium, such as a gas or a vapor, and includes a control member 36 for rendering the valve conductive. By virtue of this particular type of circuit, I employ an arrangement whereby the flow of full wave current is controlled by using only one controlled rectifier. A transformer 37, having a primary winding 38 which is energized from secondary windings 30 and 31 of transformer 28 through electric valves 33, 34 and 35, impresses a voltage of peaked wave form on control members 12 of electric valves 8 and 9 through secondary windings 39 and 40. Suitable sources of negative unidirectional biasing potential, such as batteries 41, may be connected in series relation with control members 12 and current limiting resistances 42.

In order to control the conductivities of electric valves 8 and 9 to transmit current periodically to the welding circuit 1 and to control these electric valves so that the periods of energization begin during half cycles of voltage of like polarity or during half cycles of voltage of opposite polarity of the alternating current supply circuit 1, I may employ a circuit 43 which may be termed a polarity selector and timing circuit. The circuit 43 includes a source of direct current including a positive terminal 44 and a negative terminal 45, a voltage divider including resistance 46 having an adjustable tap 47, and resistances 48, 49 and 50 which are serially connected across the direct current source, and a pair of parallel electric paths which are energized from the direct current source. One of the parallel electric paths includes a serially connected electric valve 51 and an impedance element 52 which is adjustable. A current limiting resistance 53 may also be connected in series relation with the electric valve 51 and the adjustable impedance 52. The other parallel path includes a serially connected electric valve 54 and an adjustable impedance 55, and a current limiting resistance 56 may be connected in series relation therewith if desired. The electric valves 51 and 54 are preferably of the type employing an ionizable medium, such as a gas or a vapor, and each includes an anode 57, a cathode 58 and a control member 59. A capacitance 60 is connected across the parallel paths and is alternately charged in opposite directions from the direct current source through electric valves 51 and 54 and impedances 55, 56 and 52, 53, respectively. The capacitance 60 effects commutation of current between the parallel paths and assists in generating an electrical impulse each time either electric valve 51 or electric valve 54 is rendered conductive. In order to generate a positive impulse irrespective of which path is rendered conductive, I provide a voltage divider connected across the parallel paths including a pair of serially connected capacitances 61 and 62, the common juncture of which is connected to a suitable terminal of the voltage divider such as, for example, the common juncture of resistances 48 and 49, through a resistance 63, and is also connected to control circuit 27 through conductors 64 and 65. A resistance 66 may be connected in series relation with the conductor 64, and the conductor 65 is connected to adjustable contact 47 of resistance 46.

I provide an excitation circuit 67 which is energized from the alternating current circuit 2 and includes a transformer 68 having a primary winding 69 and a secondary winding 70 provided with an electrical neutral connection 71. Transformer 68 is preferably of the type designed to supply an alternating voltage of peaked wave form. The excitation circuit 67 also includes a phase shifting arrangement, such as a rotary phase shifting device 72, which may be employed to control the phase of the voltage impressed on primary winding 69 of transformer 68. The left-hand portion of secondary winding 70 of transformer 68 may be permanently connected to control member 59 of electric valve 51 through a current limiting resistance 73, and a suitable circuit controlling means, such as a switch 74 having a movable contact member 75 and stationary contacts 76 and 77, is provided to impress on control member 59 of electric valve 54 an alternating voltage which is in phase or 180 electrical degrees out of phase with the alternating voltage impressed on control member 59 of electric valve 51. When the movable contact member 75 is in engagement with stationary contact 76, the voltages impressed on control members 59 of electric valves 51 and 54 are displaced by 180 electrical degrees, and when the movable contact member 75 is in engagement with stationary contact 77 the voltages impressed on these control members are in phase. In other words, when the movable contact member 75 is in engagement with contact 76, the circuit 43 is connected for antipolar operation or energization of the welding circuit 1, and when the movable contact member 75 engages contact 77 the circuit is in condition for unipolar operation. By antipolar operation, I refer to that type of operation in which succeeding or consecutive intervals of energization of the welding circuit 1 begin during half cycles of voltage of opposite polarity of the alternating current circuit 2, and by unipolar operation I refer to that type of control in which succeeding or consecutive intervals of energization begin during half cycles of voltage of the same polarity of circuit 2.

To control the polarity selector or periodic electrical impulse generator 43 so that the circuit supplies only a predetermined number of electrical impulses in response to a predetermined circuit controlling operation, I provide a circuit 78 which impresses on control members 59 of electric valves 51 and 54 a negative unidirectional biasing voltage of variable magnitude to permit the circuit 43 to transmit the desired number of impulses. The circuit 78 is connected to the circuit 43 through a suitable circuit controlling device, such as a switch 79 having a movable contact member 80 and stationary contact members 81 and 82. When the movable contact member 80 engages contact 81, the circuit 43 is in condition to generate trains of electrical impulses having a predetermined periodicity established by the constants of circuit 43, principally by the magnitude of capacitance 60 and impedances 52 and 55. When the movable contact member 80 of switch 79 is in engagement with contact 82, the circuit 43 is in condition to generate only a certain number of electrical impulses in response to a predetermined circuit controlling or initiating operation. The circuit 78, which may be termed a hold-off circuit, will impress a negative unidirectional biasing potential on control members 59 of electric valves 51 and 54 when the switch 79 is in the lower position. A conductor 83 connects the circuit 78 to contact 82 of switch 79. The circuit 78 includes a serially connected electric valve 84 of the glow discharge type, a capacitance 85 and a resistance 86 which are connected between positive terminal 44 and negative terminal 45 of the direct current source. An impedance, such as a resistance 87 of relatively large value, is connected across the glow discharge valve 84. A voltage divider which includes a pair of serially connected resistances 88 and 89 and a capacitance 90 connected across resistance 88, is employed to impress on control members 59 of electric valves 51 and 54 a variable negative unidirectional biasing potential. In order to initiate the operation of the circuit 78 and hence to control circuit 43 so that this circuit supplies only a predetermined number of impulses or only one electrical impulse, I provide a suitable circuit controlling device such as a switch or contactor 91 which is connected in series relation with a resistance 92 across glow discharge valve 84 and capacitance 85. When the switch 91 is in the closed circuit position, the circuits including glow discharge valve 84 and capacitance 85 are effectively short circuited, and when the switch 91 is in the open position the voltage of the direct current source including conductors 44 and 45 will be impressed across glow discharge valves 84 and capacitance 85 to permit temporary breakdown of the ionizable medium of glow discharge valve 84. It is to be understood that the switch 91 may be adapted to be manually or automatically operated. In the latter case, it is to be further understood that if the switch 91 is automatically operated I may employ any conventional control circuit for effecting operation thereof.

Certain features of the electric valve system including the polarity selector 43 and the lockout circuit 78 are disclosed and claimed in United States Letters Patent No. 2,166,310, granted July 18, 1939, on an application of Harold W. Lord, filed June 2, 1937, and which is assigned to the assignee of the present application. It is to be understood that my invention in its broader aspects need not be employed with a polarity selector and that the use of a polarity selector with a circuit of this nature is merely a matter of choice.

The operation of the embodiment of my invention shown in Fig. 1 will be explained by considering the system when it is operating to transmit a predetermined amount of energy to a welding circuit 1 from an alternating current supply circuit 2 during a definite interval of time. For such condition of operation, the movable contact 80 is placed in engagement with the stationary contact 82 of switch 79 to connect the lockout circuit 78 to the polarity selector 43. The polarity selector 43 is arranged for unipolar starting, that is, movable contact 75 of switch 74 is connected to contact 77. The reversing switch 20 is connected so that the magnitude and the polarity of the charge of capacitance 7 is such that there will be substantially no transient current when the electric valves 8 and 9 are rendered conductive. Furthermore, the resonant circuit operates so that when the electric valves 8 and 9 are rendered conductive the current which flows from the alternating current circuit 2 to the translating apparatus is substantially entirely an in-phase or energy component current, thereby taking substantially unity power factor current from the circuit 2.

The electric valves 8 and 9 are rendered conductive for a predetermined number of half cycles by the control circuits 27, 43 and 78 upon actuation of switch 91. The circuit 27 transmits a predetermined number of impulses of voltage of peaked wave form which are impressed on control members 12 of electric valves 8 and 9 to render the electric valves 8 and 9 conductive for a corresponding interval of time. The electric valves 8 and 9, being of the type employing an ionizable medium, are rendered conductive when suitable voltages are impressed on the control members 12. It will be understood by those skilled in the art that the average current conducted by these electric valves increases as the phase impressed on the control members 12 is advanced to the power factor angle, and the average current conducted by the electric valves is decreased as the voltages impressed on the control members are retarded in phase with respect to the anode voltages.

Where a load circuit is energized from an alternating current supply circuit through inductive apparatus, such as a transformer, the random energization of the load circuit necessarily entails a transient current condition. In the ordinary situation there are two possible current transients, one of these transients is that due to the exciting current transient of the transformer, and the second transient is that due to the power factor of the load. In order to minimize the exciting current transient, it is necessary to excite the transformer at the crest of the applied voltage wave. To minimize the transient due to the load power factor, it is necessary to excite the transformer at the power factor angle of the load. Inasmuch as these two points are not usually coincident, it is impossible to energize the transformer so that no transient of any kind occurs. In most cases where the welding transformer is properly designed, the exciting current is relatively small as compared with the load component of current and consequently the transformer is usually energized at or near the load power factor angle or at such a point which gives minimum total current transient. Ordinarily, this point is quite close to the load power factor angle, although in the case of a poorly designed transformer, it is possible that the point of energization would have to be shifted to minimize the transient component of the exciting current. For the purposes of the present analysis and to simplify the explanation, it will be assumed that the exciting current is relatively small and that the transformer has adequate flux carrying capacity so that excessive exciting current will not occur when the transformer is energized at the load power factor angle.

The operation of the resonant circuit which is tuned to the frequency of the alternating current circuit 2, may be better understood by referring to the operating characteristics shown in Fig. 1a. Curve A represents the voltage of the alternating current circuit 2. Curve B represents the voltage appearing across the primary winding 5 of transformer 4, which constitutes the inductance of the resonant circuit 3, and curve C represents the voltage appearing across the capacitance 7. By the proper precharging of the capacitance 7 from circuit 19, the voltage of the inductance and the voltage of the capacitance at the time at which the electric valves 8 and 9 are rendered conductive are substantially equal, so that the net or resultant current which flows is substantially an in-phase or energy component of current. For this reason, the current which is supplied by the alternating current, circuit 2 is an in-phase or energy component of current represented by curve D. The alternating current circuit 2 supplies only the in-phase component of current and the energy stored in the capacitance 7 and the inductance of winding 5 will oscillate back and forth between them, and the voltages of the capacitance and the inductance, being approximately 180 degrees out of phase, partially cancel each other, leaving only the in-phase component of voltage to be supplied from the source. If the alternating current circuit 2 is a 60 cycle source, the resonant circuit 3 may be tuned exactly or approximately to 60 cycles.

The vector B of Fig. 1b represents the voltage appearing across the terminals of the primary winding 5 of transformer 4. Vector C represents the voltage appearing across the capacitance 7 and the vectors A and D represent, respectively, the voltage and the current transmitted to the load circuit by the alternating current supply circuit 2. Since the voltage and the current are in phase, it will be understood that the power factor of the current supplied by the supply circuit 2 is substantially unity.

The operation of the embodiment of my invention shown in Fig. 1 may be more fully appreciated by referring to the operating characteristics shown in Figs. 1c, 1d and 1e. In Fig. 1c, the curves there illustrated were taken under the conditions where the capacitance 7 is precharged and where the circuit is designed to impose a unity power factor load upon the supply circuit 2. It is to be noted that the supply circuit current is essentially in phase with the supply circuit voltage and that the welding current lags the welding voltage. This set of curves illustrates the fact that the current and voltage of the supply circuit are substantially in phase even though a lagging power factor load is derived from the transformer 4.

Curve 1d represents certain operating characteristics of my invention when the capacitance 7 is precharged and when the system is designed to over-compensate for the lagging current which is demanded by the welding load; that is, the system is designed for over-correction. It is of particular interest to note that in this case the supply voltage shows a slight rise upon application of the welding load. This effect is due to the fact that when a leading current is drawn from an inductive feeder there is a rise in terminal voltage. In both curves 1c and 1d it will be noted that due to the presence of the precharged series connected capacitance 7 between the electric valves 8 and 9 and the primary winding of the transformer 4, the current derived from the supply circuit 2 is of substantially constant value devoid of any instantaneous or abrupt increase which otherwise would be occasioned by the direct connection of the transformer to the supply circuit.

Fig. 1e represents operating characteristics of my invention when the system is operating as an interrupted spot welder and when the capacitance 7 is not precharged. It will be observed that the initial transient current is smaller than the steady state value. This would not be the case with the use of shunt capacitances. After one cycle the current is substantially at its normal or steady state value. In the long spot or interrupted spot welding operations, this smaller current during the first cycle makes no significant difference in the total heat delivered to the weld and consequently for such welds no precharging circuit need be used. The reason for the lack of inrush current to the discharged capacitor is due to the fact that the welder impedance is in series; that is, the impedance of the transformer is in series relation with the capacitance, thereby limiting the current. Furthermore, the driving or forcing voltage available in the system 1 is small until the capacitance charge has been built up to its correct value for the particular voltage.

For welds of relatively short duration, such as from 1 to 10 cycles, the capacitance 7 may be precharged, thereby effecting the transmission of the same amount of current to the weld during each of the half cycles of energization including the initial cycle.

One of the principal advantages of employing the precharging circuit is that the current transmitted to the welding circuit during each of the cycles is uniform. The current transient when the series capacitance 7 is not precharged may be considered as a negative current inasmuch as it decreases the current transmitted to the welding circuit during the initial cycle, or cycles, of each energization of the welding circuit. The precharging of the capacitance is, therefore, of considerable importance when it is desired to assure the transmission of the same amount of current during each of the cycles, including the first, during each interval of energization of the welding circuit.

The amount of energy transmitted to the welding circuit 1 may be controlled in a number of ways. Of course, the amount of energy transmitted to the welding circuit 1 may be controlled by controlling the phase relationship of the voltages of peaked wave form impressed on the control members 12 by the circuit 27. This may be effected by adjustment of a rotary phase shifter 32. I provide another way in which the amount of energy transmitted to the welding circuit 1 may be controlled. The effective or net reactance of the reactive elements of the resonant circuit 3 may be controlled to vary the tuning of the resonant circuit. Of course, when the circuit is detuned, the current transmitted is reduced, effecting a reduction in the amount of current transmitted to the welding circuit 1. Conversely, when the circuit is changed from a dissonant to a resonant condition, the current is increased. The switch 15 may be connected to capacitance 13 or 14 to effect a reduction in the resultant capacitive reactance of the resonant circuit to change the amount of current transmitted to the welding circuit. By varying the capacitive reactance or the inductive reactance of the resonant circuit, the amount of energy transmitted to the welding circuit 1 may be varied throughout an appreciable range.

I provide a still further arrangement for controlling the amount of energy transmitted to the welding circuit 1 by controlling the voltage impressed upon the resonant circuit. By adjustment of the contact 18 of the autotransformer 16, and hence by controlling the magnitude of the voltage impressed upon the serially connected electric valves 8 and 9 and the resonant circuit 3, I control the current and the amount of energy transmitted to the welding circuit 1.

Of course, when the voltage impressed on the serially connected electric valves 8 and 9 and the resonant circuit is varied by adjusting the tap 18 of transformer 16, it will be understood that the net reflected impedance present in the circuit will change due to the change in the portion of winding 17 connected in the circuit. For example, if the circuit is initially tuned to the frequency of the alternating current circuit 2, adjustment of the contact 18 not only controls the voltage impressed on the circuit, but also controls in a secondary manner the natural resonance frequency of the circuit. In this manner the amount of energy transmitted to the welding circuit 1 varies as a function of two variables, that is, varies as a function of the voltage impressed on the circuit and varies as a function of the net impedance of the circuit. When the polarity selector 43 is arranged for unipolar starting, it is not necessary to reverse the connections of the direct current circuit 19 after initial choice of the proper polarity, because the charge on the capacitance 7 will always be of the proper polarity for transient current elimination for a spot length of an even number of half cycles. However, when the polarity selector circuit 43 is set for antipolar starting, it is necessary to reverse the charge on the capacitance 7 after each weld if the spot length is an odd number of half cycles. The reversing switch 20 may be operated automatically, if desired. When the polarity selector 43 is set for unipolar starting and the circuit supplies an even number of half cycles of current to the welding circuit 1, the resultant or final charge on the capacitance 7 is of the proper polarity.

The precharging circuit 19 of Fig. 1 is arranged to charge the capacitances through a high resistance 26. The time constant of the charging circuit and the capacitance, or capacitances, may amount to several seconds or may be as large as one-half minute or more. The purpose of the charging circuit is to establish upon the capacitance a proper charge prior to performing the first operation. For example, in welding systems the capacitance is precharged prior to the time of making the first spot weld. The time interval required for the charging is not troublesome since the valves in the control circuit, where valves of a filamentary type are employed, usually require a five-minute heating period during which period the capacitances may be charged. The voltage of the capacitance swings freely during normal operation in the same manner as if no charging circuit were connected because of the high impedance charging resistance 26. After the initial charging of the capacitance, the precharging circuit has very little to do since the charge on the capacitance at the termination of each spot is automatically of the proper magnitude and polarity for that type of spot. After the initial charge, the charging circuit is not required to perform an appreciable function since the residual charge is of the proper magnitude and polarity. Of course, it is to be understood that in some applications the precharging circuit may not be used and the proper charge may be placed on the capacitances by making one or more spot welds on scrap stock to establish the initial charge.

In order that the charge on the capacitance at the end of each weld be of the proper polarity, it is necessary that the starting polarity and ending polarity of each spot weld be controlled. Proper residual charge at the end of each weld may be obtained, as stated above, by using unipolar starting and by transmitting to the load circuit an even number of half cycles of current during each weld. Consequently, under this condition of operation the residual charge on the capacitances is of the desired polarity for the next succeeding weld.

Due to the resonant circuit, the electric translating system absorbs essentially only in-phase current, and therefore the power factor of the current absorbed from the alternating current circuit 2 will be substantially unity. A particular advantage of my invention is the fact that the power factor correction features are brought into operation coincidentally with the demand for power, and does not involve the permanent connection of power factor correction means across the circuit, when such power factor correction is neither needed nor desired.

Another important advantage of apparatus built in accordance with my invention is the feature thereof by virtue of which a large amount of volt-amperes may be transmitted to the load circuit while consuming a much smaller number of volt-amperes from the supply circuit. This is another way of stating that the power factor is materially improved. I have found that the correction ratio, that is the ratio of peak, instantaneous volt-ampere demand of the welding transformer divided by the peak, instantaneous volt-ampere demand imposed on the supply circuit, is maintained at a relatively high value under phase control conditions down to ten per cent heat control.

The transients which would otherwise be occasioned by the asymmetric magnetization of the core are substantially reduced by employing my invention. The use of capacitance in the translating circuit prevents the cumulative unidirectional magnetization of the core member of the transformer. As a result, the transient currents are maintained at relatively low values.

Where a precharging circuit is used in connection with arrangements for controlling the amount of energy transmitted to the load circuit by phase control of the voltages impressed on control members 12 of electric valves 8 and 9, it is necessary that the precharging voltage be adjusted corresponding to the phase control setting. However, where no precharging circuit is used, the residual charge on the capacitance will automatically arrive at the correct value and polarity for any phase control setting by making one or more spots on scrap stock, assuming that a unipolar starting control is used and that the control is arranged to give an integral or even number of half cycles. In cases where antipolar starting is required, this may be accomplished by using a spot length of an odd number of half cycles.

In Fig. 2a there is shown a modification of my invention in which provision is made for simultaneously varying the inductive reactance and the capacitive reactance of the resonant circuit. That is, suitable means, such as a switch 5a, is associated with the taps of the primary winding 5 and may be mechanically coupled to the switch 15 to control the resonant circuit to maintain it in a substantially resonant condition, while permitting control of the amount of current transmitted to the load or welding circuit 1. By so controlling the resonant circuit, the reflected resistance, as viewed from the supply circuit 2, is changed thereby providing an arrangement for controlling the amount of heat transmitted to the welding circuit while maintaining the advantages incident to the use of a resonant circuit.

Fig. 2b represents a still further modification of my invention in which I provide a suitable means for controlling the current transmitted to the resonant circuit and hence control the amount of energy current or the heat transmitted to the weld.

As a means for controlling the resonant circuit to vary the charge on capacitance 7 in accordance with the phase control setting effected by the adjustment of the rotary phase shifter 32, I provide, as diagrammatically shown in Fig. 3, interlocking means such as a mechanical interlocking arrangement 93 for controlling the precharging circuit 19 coincidentally with the adjustment of the rotary phase shifter 32. The movable element of the rotary phase shifter may be connected to an adjustable tap 94 of primary winding 24 of transformer 22 in the precharging circuit 19. The adjustment of the tap 94 controls the voltage and hence the charge of the capacitance 7. As explained above, it is desirable to obtain an adjustment of the charge on the capacitance for different phase control settings. While in Fig. 3 there has been shown a particular mechanical interlock between the heat control circuit 27 and the precharging circuit 19, it is to be understood that my invention in its broader aspects contemplates any arrangement for effecting conjoint or simultaneous control or adjustment between the heat control circuit and the precharging circuit.

In Fig. 4 of the accompanying drawings, I have diagrammatically illustrated a still further embodiment of my invention relating to the type of translating circuit shown in Figs. 1 and 3, and corresponding elements have been assigned like reference numerals. Instead of employing a separate circuit for precharging the capacitances, I provide means in the translating circuit proper for precharging the capacitance to the desired magnitude and polarity from the supply circuit 2. More particularly, I provide a unidirectional conducting device 95 and an adjustable resistance 96 for charging the capacitance 7 from the translating circuit proper. The unidirectional conducting device 95 is connected to be responsive to the voltage appearing across electric valve means 8 and 9, or in other words, between the left-hand terminals of the capacitance 7 and the upper terminals of the electric valve means 8 and 9. Due to the fact that the voltage appearing between the aforesaid terminals under some conditions of operation may not be large enough to effect the desired precharging of the capacitance 7, I provide a suitable means to step-up this voltage. For example, I may employ a transformer having a primary winding 97 and an adjustable contact 98, and a secondary winding 97'. As explained above in connection with the arrangement of Fig. 3, a suitable interlock, such as a mechanical interlock, may be connected between the rotary phase shifter 32 and the adjustable contact 98 to adjust the charge which is preestablished on the capacitance 7 under different load conditions.

In operation, the arrangement of Fig. 4 is substantially the same as that explained above in connection with Figs. 1 and 3. The capacitance 7 is precharged through the circuit including the transformer winding 97', unidirectional conducting device 95 and resistance 96. After the establishment of the initial charge the circuit is in condition to effect energization of the load circuit at an improved power factor and to eliminate substantially the starting transients. The interconnection or interlock between the phase shifter 32 and the adjustable contact 98 of the transformer 97 controls the voltage and hence the charge of the capacitance 7 for the different values of energy transmitted to the load circuit.

Fig. 5 diagrammatically illustrates a still further embodiment of my invention as applied to a system for effecting energization of a load circuit, such as a welding circuit 106, from an associated alternating current supply circuit 107. The translating apparatus comprises a substantially resonant circuit including a transformer 108 having a primary winding 109 and a capacitance 110. The reflected inductance of the primary winding 109 and the capacitance 110 constitute, when the load circuit is closed, a circuit which is tuned substantially to the frequency of the supply circuit 107. Of course, when the load circuit is not closed the inductive reactance of the primary winding 109 is substantially greater than the capacitive reactance of the capacitance 110, which of course makes the circuit dissonant.

In contradistinction to arrangements such as that shown in Fig. 1, the embodiment of my invention shown in Fig. 5 relates to that type of control in which the energization of the load circuit 106 is asynchronous with respect to the voltage of the associated circuit 107. That is, the energization of the load circuit 106 is not initiated during cycles of predetermined polarity of the associated supply circuit. Nor are the periods of energization initiated at predetermined times during cycles of voltage of the supply circuit. On the contrary, the periods of energization of the load circuit 106 are initiated at random. For example, this type of control may be effected by means of a suitable circuit controlling means such as an electro-magnetic contactor or a rotating switch 111 comprising stationary contacts 112 and 113 and a rotating contact 114. The rotating contact 114 is operated asynchronously with respect to the voltage of circuit 107 by any means, such as a direct current motor 115 which may be mechanically coupled to the rotating switch 111. The speed of the motor 115 and hence the duration of the periods of energization of the load circuit 106 may be controlled by variably energizing a field winding 116 through an adjustable resistance 117.

Suitable means, such as an autotransformer 118, may be connected to the translating circuit to control the amount of energy transmitted to the welding circuit 106 during each periodic energization thereof.

The embodiment of my invention shown in Fig. 5 operates to supply energy to the load circuit 106 at improved power factor by reducing the volt-ampere demand imposed on the supply circuit 107. In addition, the arrangement reduces starting transients, thereby further reducing the peak kva. demand imposed on the supply circuit, even though the energization of the load circuit is initiated asynchronously with respect to the voltage of the supply circuit. The system obtains improvement in the power factor of the load imposed on the supply circuit due to the storage and dissipation of energy in the resonant circuit constituted by the inductance of primary winding 109 and capacitance 110. In other words, this resonant circuit constitutes a reservoir of reactive volt-amperes which is interchanged between the supply circuit and the load circuit, thereby relieving the demand for the reactive volt-amperes of the supply circuit.

Arrangements of the nature shown in Fig. 5 are of great value where it is desired to effect improvement of the power factor of intermittent or pulsating loads without incurring the use of expensive and complicated apparatus. This type of control may be used very effectively in connection with flash welding machines, butt welding machines, projection welding machines and interrupted spot and seam welding devices. Moreover, my invention may be employed in connection with systems for improving the power factor where it is desired to energize highly intermittent loads.

In Fig. 6 another embodiment of my invention is diagrammatically illustrated as applied to a resonant circuit of the parallel type in which the welding circuit 1 is energized from the alternating current supply circuit 2 through electric valves 8 and 9. The inductance of the primary winding 5 of transformer 4 is arranged to constitute with the capacitance 7 a resonant circuit tuned substantially to the frequency of the voltage of circuit 2. Capacitance 7 may be connected to be charged from the circuit 19 through resistance 26. In order to maintain the pre-charge on the capacitance 7 and to prevent the dissipation of that charge prior to the time it is required, I provide a suitable circuit controlling means, such as a pair of electric valves 119 and 120. The electric valves 119 and 120 may have control grids 121 to maintain the electric valves non-conductive and to render the valves conductive during the desired periods.

The operation of the embodiment of my invention shown in Fig. 6 in all fundamental aspects is substantially the same as that explained above in connection with Fig. 1. The capacitance 7 is initially pre-charged by the charging circuit 19 to the desired voltage and polarity, and the electric valves 8 and 9 are rendered conductive at the desired time to effect energization of the load circuit 1. The electric valves 119 and 120 may be rendered conductive at the same time as electric valves 8 and 9 in order that the capacitance 7 be connected effectively in the translating system. Electric valves 119 and 120 may be energized from the same excitation circuit as electric valves 8 and 9 or may be energized from a separate excitation circuit. For example, this excitation circuit may be similar to the timing or control circuit 43 shown in Fig. 1.

Another modification of my invention is shown in Fig. 7 in which a parallel resonant circuit is employed. The capacitance 7 is connected to one terminal of the alternating current supply circuit 2 and the other terminal of the capacitance is connected to the other terminal of the supply circuit 2 through electric valves 119 and 120 which selectively connect and disconnect capacitance 7 at the desired times. In this embodiment of my invention, the capacitance 7, if desired, may be charged from circuit 2 through the electric valves 119 and 120 prior to the time at which the electric valves 8 and 9 are rendered conductive. Consequently, when the electric valves 8 and 9 are rendered conductive at an appreciable time after the zero point of the positive cycle of voltage of circuit 2, the capacitance 7 may be charged from the supply circuit 2 through electric valves 119 and 120 without requiring the use of an auxiliary precharging circuit 19. The precharging circuit 19, however, may be employed, if desired. As stated above in connection with the arrangement shown in Fig. 6, the control members of electric valves 8 and 9 and electric valves 119 and 120 may be energized from the same or separate excitation circuits. The electric valves 8 and 9 and valves 119 and 120 may be rendered conductive simultaneously, or the electric valves 119 and 120 may be rendered conductive is advance of the electric valves 8 and 9. Of course, it will be understood that where it is desired to render the valves 8 and 9, and 119 and 120 conductive simultaneously, a single excitation circuit, such as circuit 43 in Fig. 1, may be employed. Where it is desired to render the electric valves 119 and 120 conductive in advance of valves 8 and 9, separate circuits may be employed for the two groups of electric valves. These excitation circuits may also be of the type such as that illustrated by the timing circuit 43 in Fig. 1. As an alternative arrangement, the electric valves 8 and 9 may be rendered conductive in response to a predetermined electrical condition occasioned by the initiation of conduction of electric valves 119 and 120.

The embodiment of my invention shown in Fig. 7 operates as a parallel resonant circuit, the capacitance 7 being tuned with the inductance of transformer 4 to be in resonance with the frequency of supply circuit 2. The capacitance 7 may be precharged by means of the circuit 19, or the capacitance 7 may be precharged by the supply circuit 2 through electric valves 119 and 120 prior to the time the electric valves 8 and 9 are rendered conductive. In either case the capacitance 7 is precharged to a desired value to eliminate the starting current transients.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. The method of energizing a load circuit from an alternating current supply circuit through electric translating apparatus including a circuit comprising an inductance and a capacitance tuned substantially to the frequency of the alternating current circuit which comprises pre-establishing a charge on said capacitance and subsequently connecting the supply circuit to said load circuit through said resonant circuit.

2. The method of energizing a load circuit from an alternating current supply circuit through electric translating apparatus including a substantially resonant circuit comprising an inductance and a capacitance and an electric valve means connected between the resonant circuit and the load circuit which comprises initially establishing a charge on said capacitance and subsequently rendering said electric valve means conductive.

3. The method of initiating the energization of a load circuit from an alternating current circuit without causing an initial flow of transient current through electric translating apparatus comprising a substantially resonant circuit including a serially connected inductance and a capacitance which comprises initially charging said capacitance to a predetermined voltage and subsequently connecting said supply circuit to said load circuit through said resonant circuit.

4. In combination, an alternating current supply circuit, a load circuit, electric translating apparatus connected between said circuits and comprising means for improving the power factor of the load imposed on said supply circuit and for reducing starting current transients upon initiation of the energization of the load circuit and including a circuit tuned substantially to the frequency of said supply circuit and comprising a capacitive reactance and an inductive reactance and electric valve means connected between the tuned circuit and said supply circuit, circuit controlling means for connecting said translating apparatus in operative relation between said supply circuit and said load circuit to effect periodic energization of said load circuit, and means for controlling one of the reactances to control the current transmitted to said load circuit.

5. In combination, an alternating current supply circuit, a load circuit, electric translating apparatus connected between said circuits and comprising means for improving the power factor of the load imposed on said supply circuit including a resonant circuit tuned substantially to the frequency of said supply circuit and comprising an inductance and a capacitance, circuit controlling means for connecting said resonant circuit to said supply circuit, and means for operating said circuit controlling means for effecting periodic energization of said load circuit and for controlling the residual charge of said capacitance after each periodic energization of said load circuit so that the starting current transient is substantially eliminated upon initiation of each subsequent energization.

6. In combination, an alternating current supply circuit, a load circuit, electric translating apparatus connected between said circuits and comprising a circuit tuned substantially to the frequency of said supply circuit and including an inductance and a precharged capacitance and circuit controlling means for connecting the tuned circuit to said supply circuit, and means for operating said circuit controlling means to effect periodic energization of said load circuit during predetermined intervals of time, said capacitance serving to reduce current transients so that the current transmitted to said load circuit is substantially constant or uniform during the intervals established by said circuit controlling means.

7. In combination, an alternating current supply circuit, a load circuit, electric translating apparatus connected between said circuits and comprising a circuit tuned substantially to the frequency of said supply circuit and including an inductance and a capacitance and circuit controlling means for connecting the tuned circuit to said supply circuit, means for operating said circuit controlling means to effect energization of said load circuit, and means for establishing a predetermined charge on said capacitance prior to the time of operation of said circuit controlling means.

8. In combination, an alternating current supply circuit, a load circuit, electric translating apparatus connected between said circuits and comprising a substantially resonant circuit including an inductance and a capacitance and electric valve means connected between said resonant circuit and said supply circuit, and means for controlling said electric valve means for effecting periodic energization of said load circuit, said capacitance serving to improve the power factor of the load imposed on said supply circuit and for reducing substantially the starting current transient upon initiation of each periodic energization of said load circuit.

9. In combination, an alternating current supply circuit, a load circuit, electric translating apparatus connected between said circuits and comprising means for improving the power factor of the current consumed from said supply circuit and including a circuit tuned substantially to the frequency of said alternating current circuit and comprising an inductance and a precharged capacitance and electric valve means connected between the tuned circuit and said supply circuit, said electric valve means being of the type comprising a control member for controlling the conductivity thereof, and means for energizing said control member to render said electric valve means conductive for a predetermined number of half cycles of voltage of said supply circuit, said capacitance serving to maintain the load current substantially constant during the various half cycles of current transmitted to the load circuit during the intervals established by said last mentioned means.

10. In combination, an alternating current supply circuit, a load circuit, electric translating apparatus connected between said circuits and comprising means for improving the power factor of the current consumed from said supply circuit and including a circuit tuned substantially to the frequency of said alternating current circuit and comprising an inductance and a precharged capacitance and a pair of reversely connected electric valves connected between the tuned circuit and said supply circuit, said pair of electric valves each including a control member for controlling the conductivity thereof, and means for energizing the control members to render said electric valve means conductive during a predetermined interval of time, said capacitance serving to eliminate or substantially reduce the transients occasioned by the initiation of the energization of said load circuit by the electric valve means.

11. In combination, an alternating current supply circuit, a load circuit, electric translating apparatus connected between said circuits and including a circuit tuned substantially to the frequency of said supply circuit and comprising a serially connected inductance and a capacitance and electric valve means connected between the tuned circuit and said supply circuit, said electric valve means having a control member for controlling the conductivity thereof, means for energizing said control member, and means for pre-establishing a charge on said capacitance prior to the time at which said electric valve means is rendered conductive.

12. In combination, an alternating current supply circuit, a load circuit, electric translating apparatus connected between said circuits and including a circuit tuned substantially to the frequency of said supply circuit and comprising a serially connected inductance and a capacitance and electric valve means connected between the tuned circuit and said supply circuit, said electric valve means having a control member for controlling the conductivity thereof, means for energizing said control member, and means for establishing a predetermined charge on said capacitance so that the current supplied from said supply circuit to said translating apparatus is substantially entirely an energy circuit.

13. In combination, an alternating current supply circuit, a load circuit, electric translating apparatus connected between said circuits comprising a circuit tuned substantially to the frequency of said supply circuit and comprising an inductance and a precharged capacitance, electric valve means connected between said supply circuit and the tuned circuit to effect energization of said load circuit during a predetermined number of half cycles of voltage of said supply circuit, said capacitance serving to prevent transients upon initiation of the energization of said load circuit by said electric valve means so that a uniform wave of current is transmitted to said load circuit, and variable voltage transforming means connected between said supply circuit and said resonant circuit to control the amount of power transmitted to said load circuit during said predetermined number of half cycles.

14. In combination, an alternating current supply circuit, a load circuit, a capacitance, a transformer having a winding connected in series relation with said capacitance, the inductance of said winding and said precharged capacitance constituting a circuit tuned substantially to the frequency of said supply circuit, electric valve means connected in series relation with said capacitance and said winding to effect energization of said load circuit during a predetermined number of half cycles of voltage of said supply circuit, said capacitance serving to effect the transmission of a uniform current to said load circuit during said predetermined number of half cycles, and variable voltage transforming means connected between said supply circuit and said electric valve means and said resonant circuit.

15. In combination, an alternating current supply circuit, a load circuit, electric translating apparatus connected between said circuits and comprising means for improving the power factor of the current consumed from said supply circuit and including a circuit tuned substantially to the frequency of said supply circuit and comprising an inductance and a precharged capacitance, electric valve means connected in series relation with said inductance and said capacitance for effecting intermittent energization of said load circuit, said capacitance serving to prevent transients upon initiation of each energization of said load circuit by said electric valve means, and means for varying the effective value of said capacitance to control the amount of energy transmitted to said load circuit.

16. In combination, an alternating current supply circuit, a load circuit, a circuit tuned substantially to the frequency of said supply circuit and comprising an inductance and a precharged capacitance, electric value means connected in series relation with said inductance and capacitance for effecting intermittent energization of said load circuit during intervals of a predetermined number of half cycles of voltage of said supply circuit, said capacitance serving to prevent transients upon initiation of each energization of said load circuit occasioned by said electric valve means, and variable voltage transforming means connected between said supply circuit and said electric valve means and said last mentioned circuit for controlling the amount of energy transmitted to said load circuit.

17. In combination, an alternating current supply circuit, a load circuit, electric translating apparatus connected between said circuits and including a circuit tuned substantially to the frequency of said supply circuit and comprising an inductance and a capacitance, electric valve means connected in series relation with the tuned circuits, said electric valve means being of the type having a control member for controlling the conductivity thereof, means for impressing on said control member a periodic voltage to render said electric valve means conductive periodically for predetermined intervals of time, said capacitance serving to reduce current transients upon initiation of each energization of said load circuit by said electric valve means, and means for controlling the phase of the periodic voltage impressed on said control member to control the amount of energy transmitted to said load circuit.

18. In combination, an alternating current supply circuit, a load circuit, electric translating apparatus connected between said circuits and including a circuit tuned substantially to the frequency of said supply circuit and comprising an inductance and a capacitance, electric valve means connected in series relation with the tuned circuit, and a direct current circuit for pre-establishing a charge on said capacitance.

19. In combination, an alternating current supply circuit, a load circuit, electric translating apparatus connected between said circuits and including a circuit tuned substantially to the frequency of said supply circuit and comprising an inductance and a capacitance, electric valve means connected in series relation with the tuned circuit, said electric valve means having a control member, means for energizing said control member to render said electric valve means conductive to effect energization of said load circuit, and a direct current circuit for pre-establishing a charge on said capacitance so that the current which flows upon initiation of the energization of said load circuit is substantially entirely an in-phase energy current.

20. In combination, an alternating current supply circuit, a load circuit, electric translating apparatus connected between said circuits and including a circuit tuned substantially to the frequency of said supply circuit and comprising an inductance and a capacitance, electric valve means connected between the tuned circuit and said supply circuit, said electric valve means having a control member for rendering said electric valve means conductive to effect energization of said load circuit, means for energizing said control member to render said electric valve means conductive for a predetermined interval of time, and means for establishing a charge on said capacitance prior to the time at which said electric valve means is rendered conductive and for establishing a predetermined initial unidirectional voltage across said capacitance.

21. In combination, an alternating current supply circuit, a load circuit, electric translating apparatus connected between said circuits and comprising means for improving the power factor of the current consumed from said supply circuit and including a circuit tuned substantially to the frequency of said supply circuit and comprising a capacitive reactance and an inductive reactance, electric valve means connected in series relation with the tuned circuit for effecting energization of said load circuit during recurring intervals of a predetermined number of half cycles of voltage of said supply circuit, said capacitance serving to reduce the starting current transients upon initiation of each of said intervals of energization, and means for detuning said circuit by varying the inductive reactance to control the amount of energy transmitted to said load circuit.

22. In combination, an alternating current supply circuit, a load circuit, a transformer connected to said load circuit, circuit controlling means for connecting said transformer to said supply circuit to effect intermittent energization of the load circuit, and means for improving the power factor of the current consumed from said supply circuit comprising a precharged capacitance connected in circuit with said transformer and said circuit controlling means, said capacitance and the inductance of said transformer constituting a circuit tuned substantially to the frequency of said supply circuit and serving to prevent cumulative unidirectional magnetization of said transformer thereby serving to reduce substantially the starting current transients upon initiation of each energization of said transformer from said supply circuit.

23. In combination, an alternating current supply circuit, a load circuit, a transformer, circuit controlling means for intermittently connecting said transformer in power transmitting relationship between said supply circuit and said load circuit to effect intermittent energization of said load circuit, and means for improving the power factor of the current consumed from said supply circuit and for eliminating or reducing objectionable transients by the prevention of cumulative unidirectional magnetization of said transformer upon the initiation of energization of said load circuit when said circuit controlling means connects said transformer to said supply circuit and comprising a capacitance connected in circuit with said transformer and said circuit controlling means.

24. In combination, an alternating current supply circuit, a load circuit, a transformer, circuit controlling means for connecting said transformer in power transmitting relation between said supply circuit and said load circuit, a capacitance connected in circuit with said transformer and said circuit controlling means to improve the power factor of the load imposed on said supply circuit, and means for controlling said circuit controlling means to effect energization of said load circuit during predetermined recurring intervals of even number of half cycles and for initiating the intervals of energization during half cycles of voltage of the same polarity of said supply circuit so that the residual charge on said capacitance at the end of each interval is of the polarity to eliminate substantially the starting transient upon subsequent energization of said load circuit.

25. In combination, an alternating current supply circuit, a load circuit, a transformer, electric valve means for connecting said transformer in power transmitting relationship between said supply circuit and said load circuit, a precharged capacitance connected in circuit with said transformer and said circuit controlling means and constituting with the inductance of said transformer when said load is energized a circuit tuned substantially to the frequency of said supply circuit thereby to improve the power factor of the load imposed on said supply circuit, and means for controlling the conductivity of said electric valve means to effect energization of said load circuit for a predetermined interval of time.

26. In combination, an alternating current supply circuit, a load circuit, a transformer, electric valve means for connecting said transformer in power transmitting relationship between said supply circuit and said load circuit, a capacitance connected in circuit with said transformer and said circuit controlling means and constituting with the inductance of said transformer when said load circuit is energized a circuit tuned substantially to the frequency of said supply circuit thereby to improve the power factor of the load imposed on said supply circuit, and means for controlling the conductivity of said electric valve means to effect energization of said load circuit for a predetermined even or odd number of half cycles of voltage of said supply circuit thereby controlling the polarity of the residual charge on said capacitance.

27. In combination, an alternating current supply circuit, a load circuit subject to intermittent or pulsating loads, a transformer having a winding, means for connecting said winding in power transmitting relationship between said supply circuit and said load circuit, a capacitance connected in series relation with said winding and constituting with the inductance of said winding when said load circuit is substantially energized a circuit tuned substantially to the frequency of said supply circuit to improve the power factor of the load imposed on said supply circuit, and means for controlling the period of energization of the load circuit so that the residual charge of said capacitance eliminates substantially the starting current transient upon each subsequent energization of the load circuit.

28. In combination, an alternating current supply circuit, a load circuit subject to intermittent or pulsating loads, a transformer having a winding, a capacitance connected in series relation with said winding and constituting with the inductance thereof when said circuit is energized a circuit tuned substantially to the frequency of said supply circuit to improve the power factor of the load imposed on said supply circuit and to eliminate substantially the transients due to the intermittent or pulsating application of load, and means operating asynchronously relatively to the voltage of said supply circuit for connecting said transformer and said capacitance in power transmitting relationship between said supply circuit and said load circuit to effect energization of said load circuit for a predetermined interval of time.

29. In combination, an alternating current supply circuit, a load circuit, a transformer, circuit controlling means for connecting said transformer in power transmitting relation between said supply circuit and said load circuit, a capacitance connected in circuit with said transformer and said circuit controlling means to improve the power factor of the load impressed on said supply circuit, and means for controlling said circuit controlling means to effect energization of said load circuit during predetermined recurring intervals of odd number of half cycles and for initiating the succeeding intervals of energization during half cycles of voltage of opposite polarity of said supply circuit so that the residual charge on said capacitance at the end of each interval is of the polarity to prevent a starting transient upon the subsequent energization of said load circuit.

30. In combination, an alternating current supply circuit, a load circuit, a transformer having a winding, a capacitance connected in series with said winding and constituting with the inductance thereof when said load circuit is energized a circuit tuned substantially to the frequency of said supply circuit thereby to improve the power factor of the load imposed on said supply circuit, circuit controlling means connected in series relation with said winding and said capacitance to effect energization of said load circuit, and means connected to be energized from said supply circuit for precharging said capacitance to prevent current transients upon energization of said load circuit.

31. In combination, an alternating current supply circuit, a load circuit, a transformer having a winding, a capacitance connected in series with said winding and constituting with the inductance thereof when said load circuit is energized a circuit tuned substantially to the frequency of said supply circuit thereby to improve the power factor of the load imposed on said supply circuit, circuit controlling means connected in series relation with said winding and said capacitance to effect energization of said load circuit, and means comprising a unidirectional conducting device connected across said circuit controlling means for precharging said capacitance to prevent current transients upon energization of said load circuit.

32. In combination, an alternating current supply circuit, a load circuit, a transformer having a winding, a capacitance connected in series with said winding and constituting with the inductance thereof when said load circuit is energized a circuit tuned substantially to the frequency of said supply circuit thereby to improve the power factor of the load imposed on said supply circuit, circuit controlling means connected in series relation with said winding and said capacitance to effect energization of said load circuit, and means comprising a transformer connected across said circuit controlling means and a unidirectional conducting device energized from said transformer for charging said capacitance to prevent current transients upon energization of said load circuit.

33. In combination, an alternating current supply circuit, a load circuit, electric translating apparatus connected between said circuits and comprising means for improving the power factor of the load imposed on said supply circuit including a substantially resonant circuit including an inductance and a precharged capacitance, electric valve means connected between said resonant circuit and said supply circuit, said electric valve means having a control member for controlling the conductivity thereof, said capacitance serving for preventing the occurrence of current transients in said load circuit occasioned by said electric valve means in the initiation of each energization of said load circuit, and means for impressing on said control member a periodic voltage variable in phase with respect to the voltage of said supply circuit to control the amount of power transmitted to said load circuit.

34. In combination, an alternating current supply circuit, a load circuit, electric translating apparatus connected between said circuits and comprising means for improving the power factor of the load imposed on said supply circuit including a substantially resonant circuit comprising an inductance and a precharged capacitance, electric valve means connected between said resonant circuit and said supply circuit, and means for simultaneously controlling said capacitance and said inductance to control the amount of energy current transmitted to said load circuit.

35. In combination, an alternating current supply circuit, a load circuit, electric translating apparatus connected between said circuits and comprising means for improving the power factor of the load imposed on said supply circuit including a resonant circuit tuned substantially to the frequency of said supply circuit and comprising an inductive reactance and a precharged capacitance, circuit controlling means for connecting said resonant circuit to said supply circuit, means for operating said circuit controlling means, and means for simultaneously controlling the capacitance and the inductive reactance to control the energy transmitted to said load circuit.

36. In combination, an alternating current supply circuit, a load circuit, electric translating apparatus connected between said circuits and comprising means for improving the power factor of the load imposed on said supply circuit and including a resonant circuit tuned substantially to the frequency of said supply circuit and comprising an inductance and a capacitance, circuit controlling means for connecting said resonant circuit to said supply circuit, means for operating said circuit controlling means for effecting intermittent energization of said load circuit and for controlling the polarity of the residual charge of said capacitance after each energization thereby to eliminate substantially the starting current transient upon subsequent energization of said load circuit, and a variable impedance element connected in series relation with said resonant circuit for controlling the power transmitted to said load circuit during each energization of said load circuit.

37. In combination, an alternating current supply circuit, a load circuit, electric translating apparatus connected between said circuits and comprising means for improving the power factor of the load imposed on said supply circuit and including a serially connected inductance, a capacitance and a pair of reversely connected electric valve means each having a control member for controlling the conductivity thereof, control means for impressing variable voltage on said control members, means for preestablishing a charge on said capacitance, and means for controlling said control means and the charging means for said capacitance.

38. In combination, an alternating current supply circuit, a load circuit, electric translating apparatus connected between said circuits and comprising means for improving the power factor of the load imposed on said supply circuit and including a serially connected inductance, a capacitance and a pair of reversely connected electric valve means each having a control member for controlling the conductivity thereof, control means for impressing variable voltages on said control members to control the magnitude of the current transmitted to said load circuit, means for preestablishing a charge on said capacitance prior to the initiation of the energization of said load circuit to eliminate transient starting currents, and means for conjointly controlling said control means and the means for charging said capacitance.

39. In combination, an alternating current supply circuit, a load circuit, a transformer connected to said load circuit, circuit controlling means for connecting said transformer to said supply circuit, a capacitance which with the inductance of said transformer constitutes a circuit tuned substantially to the frequency of said supply circuit, means for precharging said capacitance prior to the energization of said load circuit, and a second circuit controlling means for connecting said capacitance in operative relation with said transformer.

40. In combination, an alternating current supply circuit, a load circuit, a transformer connected to said load circuit, circuit controlling means for connecting said transformer to said supply circuit, a capacitance which with the inductance of said transformer constitutes a circuit tuned substantially to the frequency of said supply circuit, means for precharging said capacitance prior to the energization of said load circuit, and means for connecting said capacitance directly across said transformer in parallel relation thereto.

41. In combination, an alternating current supply circuit, a load circuit, a transformer connected to said load circuit, circuit controlling means for connecting said transformer to said supply circuit, a capacitance which with the inductance of said transformer constitutes a circuit tuned substantially to the frequency of said supply circuit for improving the power factor of the load imposed on said supply circuit, a second circuit controlling means for connecting said capacitance directly across said supply circuit, and means for precharging said capacitance from said supply circuit.

42. In combination, an alternating current supply circuit, a low power factor load circuit, circuit controlling means for connecting said load circuit to said supply circuit, a capacitance, and means for connecting said capacitance to said load circuit prior to the energization of said load circuit.

43. In combination, an alternating current supply circuit, a load circuit, a transformer connected to said load circuit, a capacitance, means for connecting said capacitance to said supply circuit, and circuit controlling means for connecting said transformer to said supply circuit subsequently to the connection of said capacitance to said supply circuit.

44. In combination, an alternating current supply circuit, a load circuit, a transformer connected to said load circuit, circuit controlling means for connecting said transformer to said supply circuit, and means for eliminating or substantially reducing the current transients upon energization of said load circuit comprising a capacitance and means for connecting said capacitance to said supply circuit prior to the operation of said circuit controlling means.

45. In combination, an alternating current supply circuit, a load circuit, a transformer, circuit controlling means for connecting said transformer in power transmitting relation between said supply circuit and said load circuit, a capacitance connected in circuit with said transformer and said circuit controlling means to improve the power factor of the load imposed on said supply circuit, and means for controlling said circuit controlling means to effect energization of said load circuit during recurring intervals of a predetermined number of half cycles and for initiating the intervals of energization during half cycles of voltage of a predetermined polarity of said supply circuit so that the residual charge on said capacitance at the end of each of said intervals is of a polarity to eliminate substantially the starting current transient upon subsequent energization of said load circuit.

46. In combination, an alternating current supply circuit, a load circuit, electric translating apparatus connected between said supply circuit and said load circuit and comprising a resonant circuit including an inductance and a capacitance and circuit controlling means for controlling the transfer of power between said supply circuit and said load circuit, and means for controlling said circuit controlling means to effect energization of said load circuit during recurring intervals of a predetermined number of half cycles and for initiating the intervals of energization during half cycles of voltage of a predetermined polarity of said supply circuit so that the residual charge on said capacitance at the end of each interval is of a polarity to eliminate substantially the starting current transient upon subsequent energization of said load circuit.

47. The method of energizing a load circuit from an alternating current supply circuit through electric translating apparatus including a circuit comprising an inductance and a capacitance which comprises pre-establishing a charge on said capacitance and effecting energization of the load circuit through the translating apparatus, whereby the charge of the capacitance substantially eliminates the starting current transient and improves the power factor of the load imposed on the supply circuit.

48. In combination, an alternating current supply circuit, a load circuit, a transformer connected to said load circuit, circuit controlling means for connecting said transformer to said supply circuit, means for operating said circuit controlling means intermittently, and a capacitance connected in series relation with said transformer, said supply circuit and said circuit controlling means to prevent cumulative unidirectional magnetization of said transformer thereby reducing the starting current transient upon initiation of the energization of said transformer.

49. In combination, an alternating current supply circuit, a load circuit, a transformer connected to said load circuit, circuit controlling means operative asynchronously with respect to the voltage of said supply circuit for connecting said transformer to said supply circuit, means for operating said circuit controlling means intermittently for effecting energization of said load circuit during predetermined intervals of time, and a capacitance connected in series relation with said transformer, said supply circuit and said circuit controlling means to prevent cumulative unidirectional magnetization of said transformer thereby reducing the starting current transient upon initiation of the energization of said transformer.

50. In combination, an alternating current supply circuit, a load circuit, a transformer connected to said load circuit, circuit controlling means for connecting said transformer in power transmitting relation between said supply circuit and said load circuit, a capacitance connected in circuit with said transformer and said circuit controlling means, and means for precharging said capacitance to eliminate starting transient upon connection of said transformer to said supply circuit by said circuit controlling means.

51. In combination, an alternating current supply circuit, a load circuit, a transformer connected to said load circuit, circuit controlling means for connecting said transformer in power transmitting relation between said supply circuit and said load circuit, and a precharged capacitance connected in circuit with said transformer and said supply circuit to eliminate the starting current transient upon connection of said transformer to said supply circuit by said circuit controlling means.

LOUIS G. LEVOY, Jr.

CERTIFICATE OF CORRECTION.

Patent No. 2,256,209.　　　　　　　　　　　　　　September 16, 1941.

LOUIS G. LEVOY, JR.

It is hereby certified that error appears in the printed specification of the above numbered patent requiring correction as follows: Page 5, first column, line 61, after "current" strike out the comma; page 10, second column, line 34, claim 16, for the word "value" read --valve--; page 14, second column, line 10, claim 50, before "transient" insert --current--; and that the said Letters Patent should be read with this correction therein that the same may conform to the record of the case in the Patent Office.

Signed and sealed this 4th day of November, A. D. 1941.

(Seal)

Henry Van Arsdale,
Acting Commissioner of Patents.